United States Patent
Huang

(10) Patent No.: US 12,015,236 B2
(45) Date of Patent: Jun. 18, 2024

(54) DIELECTRIC-GRATING-WAVEGUIDE FREE-ELECTRON LASER

(71) Applicant: National Tsing Hua University, Hsinchu (TW)

(72) Inventor: Yen-Chieh Huang, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 364 days.

(21) Appl. No.: 17/382,350

(22) Filed: Jul. 22, 2021

(65) Prior Publication Data

US 2023/0029210 A1   Jan. 26, 2023

(51) Int. Cl.
*H01S 3/09* (2006.01)
*H01S 3/063* (2006.01)
(Continued)

(52) U.S. Cl.
CPC .......... *H01S 3/0903* (2013.01); *H01S 3/0635* (2013.01); *H01S 3/0675* (2013.01); *H01S 3/108* (2013.01); *H01S 3/0637* (2013.01)

(58) Field of Classification Search
CPC ............................... H01S 3/0903; H01S 1/005
See application file for complete search history.

(56) References Cited

U.S. PATENT DOCUMENTS 2,866,917 A * 12/1958 Salisbury ................ H01J 25/36
  372/74
2,939,998 A * 6/1960 Salisbury ................ H01J 25/38
  315/3.5

(Continued)

FOREIGN PATENT DOCUMENTS

CN   115275754 A  * 11/2022
JP    56050591 A  *  5/1981
(Continued)

OTHER PUBLICATIONS

Yuan-Yao Lin et al., "Theory of Coherent Radiation From a Grating-Waveguide Free-Electron Laser", Proceedings of the 27th International Free Electron Laser Conference, Aug. 21-26, 2005, pp. 239-242.

(Continued)

*Primary Examiner* — Joshua King
(74) *Attorney, Agent, or Firm* — JCIPRNET

(57) ABSTRACT

A dielectric-grating waveguide free-electron laser device generating coherent or laser-like radiation is provided. An electron beam propagates next to a dielectric waveguide with a built-in grating structure to generate highly confined coherent or laser-like radiation in the waveguide through the Bragg resonance, the backward-wave resonance, or the Fabry-Perot resonance provided by the grating-waveguide structure. The dielectric-grating waveguide can be made of linear optical materials or nonlinear optical materials or combination of linear and nonlinear optical materials to enable versatile functionalities, such as laser generation, laser-wavelength conversion, and laser signal processing. Owing to the build-up of the laser modes inside the dielectric waveguide, coherent or laser-like Smith-Purcell radiation is also generated above the grating via coupling and bunching of the electrons with the surface mode fields.

17 Claims, 8 Drawing Sheets

(51) Int. Cl.
*H01S 3/067* (2006.01)
*H01S 3/108* (2006.01)

(56) References Cited

U.S. PATENT DOCUMENTS

| | | | | |
|---|---|---|---|---|
| 3,835,407 | A * | 9/1974 | Yariv | H03F 3/55 330/307 |
| 3,860,880 | A * | 1/1975 | Yariv | H01J 25/38 331/82 |
| 4,367,551 | A * | 1/1983 | Gover | H01S 3/0903 372/2 |
| 4,727,550 | A * | 2/1988 | Chang | H01S 3/0903 315/5 |
| 5,263,043 | A * | 11/1993 | Walsh | H01S 3/0903 372/4 |
| 5,268,693 | A * | 12/1993 | Walsh | H01S 3/0903 372/74 |
| 5,790,585 | A * | 8/1998 | Walsh | H01S 3/0903 372/74 |
| 6,301,041 | B1 * | 10/2001 | Yamada | H01S 1/005 372/74 |
| 6,448,850 | B1 * | 9/2002 | Yamada | H01S 3/0903 315/5 |
| 7,116,878 | B2 * | 10/2006 | Zoorob | B82Y 20/00 385/129 |
| 7,450,794 | B2 * | 11/2008 | Gorrell | G02B 6/12004 385/14 |
| 7,579,609 | B2 * | 8/2009 | Gorrell | B82Y 20/00 977/932 |
| 7,626,179 | B2 * | 12/2009 | Gorrell | H01S 3/09 250/493.1 |
| 7,710,040 | B2 * | 5/2010 | Gorrell | H01J 25/00 315/505 |
| 7,994,472 | B2 * | 8/2011 | Plettner | H05H 7/06 250/306 |
| 2006/0050269 | A1 * | 3/2006 | Brownell | G02B 5/1814 372/102 |
| 2006/0062258 | A1 * | 3/2006 | Brau | H01S 3/0903 372/2 |
| 2006/0216940 | A1 * | 9/2006 | Gorrell | H01S 3/0903 257/E21.314 |
| 2010/0044598 | A1 * | 2/2010 | Brownell | H01S 3/0903 250/504 R |
| 2010/0094266 | A1 * | 4/2010 | Travish | H01J 35/14 606/15 |
| 2010/0289099 | A1 * | 11/2010 | Gorrell | H01J 25/00 257/431 |
| 2014/0070732 | A1 * | 3/2014 | Solgaard | H05H 15/00 315/500 |
| 2015/0330838 | A1 * | 11/2015 | Mazumder | G01J 9/02 356/477 |
| 2017/0149198 | A1 * | 5/2017 | Wakabayashi | H01S 3/08059 |
| 2018/0287329 | A1 * | 10/2018 | Yang | H01J 7/44 |

FOREIGN PATENT DOCUMENTS

| | | | |
|---|---|---|---|
| JP | 2693582 B2 | * | 12/1997 |
| RU | 129308 U1 | * | 6/2013 |
| WO | WO-9204747 A1 | * | 3/1992 |

OTHER PUBLICATIONS

"Office Action of Taiwan Counterpart Application", issued on May 30, 2023, p. 1-p. 5.

J. F. Schmerge et al., "The Free-Electron Laser as a Laboratory Instrument", IEEE Journal of Quantum Electronics, Jun. 1995, pp. 1166-1171.

J.E. Walsh et al., "A 100 μm Cherenkov Laser Experiment", Nuclear Instruments and Methods in Physics Research Section A250, Sep. 1, 1986, pp. 308-311.

J. Urata et al., "Superradiant Smith-Purcell Emission", Phys ical Review Letters, Jan. 19, 1998, pp. 516-519.

H. L. Andrews et al., "Dispersion and attenuation in a Smith-Purcell free electron laser", Physical Review Special Topics—Accelerators and Beams, May 20, 2005, pp. 1-9.

Hesham Fares et al., "Characterization of Optical Emission Mechanism Utilizing Traveling Electron Beam on a Waveguide", IEEE Journal of Quantum Electronics, Jun. 2010, pp. 981-990.

\* cited by examiner

DIELECTRIC-GRATING-WAVEGUIDE FREE-ELECTRON LASER

FIELD OF THE INVENTION

The present invention relates to a laser, and, in particular, to an optically linear or nonlinear dielectric-grating waveguide emitting laser radiations when driven by a moving electron beam.

BACKGROUND OF THE INVENTION

Electromagnetic radiations are useful for numerous applications. Radiations are generally divided into two categories, coherent radiation and incoherent radiation. The former is exemplified by the radiation from a laser source and the latter is commonly seen from an ordinary light bulb. The present invention is related to the generation of coherent or laser-like radiation from a moving electron beam propagating close to a dielectric-grating waveguide.

A moving electron can transfer its kinetic energy to generating or amplifying a radiation. A laser driven by moving electrons is often dubbed as a free-electron laser (FEL). For example, an undulator FEL operating in vacuum is driven by a relativistic electron beam traversing alternating magnetic fields in an undulator. Coherent or laser-like radiation is generated through the stimulated emission of the relativistic electrons with energy coupling between the transverse component of the radiation field and the transverse wiggle of the electrons. An undulator FEL, utilizing the transverse-field-coupling scheme, usually requires a high-energy accelerator, a bulky undulator, and sometimes a resonator cavity to generate laser-like radiation (Schmerge et al., IEEE JQE 31, No. 6, 1166 (1995)).

For non-relativistic electrons, the electrons are too slow to efficiently couple their energy to the fast-moving radiation field propagating in vacuum. One successful embodiment in the prior art is to utilize a material or structure to slow down the radiation wave. Therefore, the phase velocity of the longitudinal radiation field in the material structure is matched to the speed of the longitudinal motion of the slow electrons. In such a longitudinal-field coupling scheme, coherent or laser-like radiation is generated through the stimulated emission of the slow electrons with energy coupling between the longitudinal component of the radiation field and the longitudinal motion of the electrons. The slow-wave material, adopted by the so-called Cherenkov radiator, can be a dielectric with a refractive index larger than 1. A Cherenkov radiator becomes a Cherenkov laser, when a mirror resonator or the so-called Fabry-Perot cavity with reflection feedbacks is added to the dielectric to induce stimulated emission. J. E. Walsh et al. (Nuclear Instrument and Methods in Physics Research A250, (1986) 308-311) proposed an experiment to generate Cherenkov radiation from a dielectric thin film. However, the proposal does not have resonance feedbacks to ensure the coherence of the radiation.

In another prior art, a periodic metallic waveguide with an electron aperture is also served as a slow-wave structure. Notable devices in this category include traveling-wave tube, backward wave oscillator, and klyston, although their radiation spectrum is in the microwave regime. To be effective, the periodicity of the slow-wave structure has to be comparable to a radiation wavelength. When the target radiation wavelength is in the infrared and optical regime, the slow-wave structure and the electron aperture become too small to operate. Furthermore, in the infrared and optical regime, metal has a much higher loss than a dielectric, which prevents it from building up a laser-like radiation. To ease electron injection, in the past, a planar metal grating with a semi-open space was considered to accommodate electrons flying above. This is the so-called Smith-Purcell radiator, in which incoherent radiations of different wavelengths are generated and distributed along different angular directions above the grating. FIG. 1 illustrates a Smith-Purcell radiation in the prior art, wherein an electron beam 1001 generated by an electron source 100 is injected in a vacuum 1010 above a planar metal grating 1030 to generate radiations 1021, 1022, 1023 and 1024 above the planar metal grating 1030. Owing to the diffraction radiation from the grating grooves, the radiation wavelength $\lambda_{sp}$ has an angular dependence, given by $$\lambda_{sp,m} = \frac{\Lambda_g}{m}\left(\frac{1}{\beta} - \sin\theta\right) \tag{1}$$

where $\theta$ is the angle of radiation relative to the surface normal of the grating, $\Lambda_g$ is the grating period, m is the diffraction order, and $\beta$ is the speed of the electron normalized to the speed of light. As a result, incoherent radiations of different wavelengths 1021, 1022, 1023, and 1024 are scattered along different angular directions. A Smith-Purcell radiator becomes a Smith-Purcell laser or the so-called orotron, when a cavity resonator is added to resonantly amplify the radiation of a particular wavelength along a certain direction.

Adding a Fabry-Perot type resonator increases the complexity of a laser system. It was later understood by J. Urata et al. (Phys. Rev. Letts. 80, 516 (1998)) in experiment and by H. L. Andrews et al. (Phys. Rev. STAB 8, 050703 (2005)) in theory, that a semi-open planar metal grating supports both slow-wave modes on and Smith-Purcell radiation modes above its surface. A periodic metallic structure modifies the dispersion of the electromagnetic wave. The slow-wave mode with a negative group velocity can establish coherent or laser-like radiation via internal distributed feedback from the backward wave. This internal distributed-feedback resonance is called backward-wave resonance. The coherent radiation from backward-wave resonance can induce electron bunching to further generate Smith-Purcell superradiance at the harmonics of the bunching frequency. This process does not require a cumbersome Fabry-Perot cavity in the system to generate laser radiation. However, the surface wave from the backward-wave resonance is non-radiative and scattered at the edges of the metal grating. Furthermore, the coherent Smith-Purcell radiation is generated at an angle as a function of the radiation wavelength. Such scattered and angularly dependent radiations impose a difficulty for applications.

In another prior art, Yang et al. (US2018/0287329) discloses an apparatus for generating Smith-Purcell radiation by passing an electron beam over a periodic dielectric structure. However, in Yang's disclosure, there is no waveguide-like structure in the apparatus for confining and intensifying the radiation feedback to the electrons for stimulated emission. Thus, Yang's apparatus is highly unlikely to turn the generated Smith-Purcell radiation into a coherent or laser-like radiation.

All the aforementioned free-electron lasers in the prior art suffer from one or several disadvantages, such as requiring a bulky accelerator or cumbersome resonator, generating scattered or off-axis radiations, having a too small electron aperture and a high metallic loss in the infrared and optical regime. To overcome these difficulties in the prior art, the present invention utilizes a dielectric-grating waveguide excited by an electron beam to generate coherent or laser-like radiation guided inside the dielectric channel for ease of applications. Fabrication of the structure is compatible with the well-established semiconductor lithographic patterning technologies for mass production. The coherence of the radiation is ensured by resonances in the dielectric-waveguide structure, including the grating resonance, Fabry-Perot resonance, and the backward-wave resonance. In some embodiments, the waveguide is a single, semi-open dielectric-grating for ease of electron injection. In such a case, the coherent Smith-Purcell radiation from the dielectric-grating can be generated due to waveguide-mode induced electron bunching. In some embodiments, the waveguide includes two halves of gratings separated by a channel for the electron beam to pass through for a stronger coupling among the electrons, electromagnetic fields, and the dielectric.

There are different kinds of dielectric. The most commonly seen dielectric is linear optical materials, in which the polarization of the material responds linearly to the excitation of an electric field. A coherent or laser-like radiation can sometimes induce strong nonlinear polarization in some dielectric, called the nonlinear optical material. A nonlinear optical material is useful for laser wavelength conversions or active optical control. Now that well confined and guided coherent or laser-like radiation can be generated from the present invention, the said dielectric-grating waveguide can be a linear optical material or a nonlinear optical material or combination of the two for enabling versatile functionalities such as laser generation, laser-wavelength conversion, and laser signal processing.

Therefore, it is an intention of the present invention to provide a new, compact, effective free-electron laser and its embodiments to overcome the above-mentioned drawbacks in the prior art.

SUMMARY OF THE INVENTION

In accordance with one aspect of the present invention, a dielectric-grating-waveguide free-electron laser device is provided. The laser device includes: an electron source, generating an electron beam; and a dielectric-grating waveguide, wherein the electron beam excites electromagnetic modes of the dielectric-grating waveguide to generate coherent or laser-like radiation along a direction of the electron beam.

According to some embodiments, the electron beam propagates in a free space atop the dielectric-grating waveguide.

According to some embodiments, the dielectric-grating waveguide has a corrugated slab structure.

According to some embodiments, the dielectric-grating waveguide has a smooth slab structure with a periodically varying refractive index.

According to some embodiment, the dielectric-grating waveguide is made of linear optical material or nonlinear optical material, or combination of linear and nonlinear optical materials.

According to some embodiments, the laser device further comprises a substrate under the dielectric-grating waveguide to support the dielectric-grating waveguide.

According to some embodiments, a material of the substrate is a metal or a dielectric with a refractive index lower than an average refractive index of the dielectric-grating waveguide.

According to some embodiments, the dielectric-grating waveguide supports a transverse-magnetic (TM) mode with a phase velocity of the TM mode matched to a velocity of the electron beam.

According to some embodiments, the electron beam induces distributed feedback resonances in the dielectric-grating waveguide, including Bragg resonances and backward-wave resonance, to establish a laser oscillation inside the dielectric-grating waveguide.

According to some embodiments, two end facets of the dielectric-grating waveguide are coated or uncoated with reflecting optical layers, which provide the Fabry-Perot resonance to establish a laser oscillation inside the dielectric-grating waveguide.

According to some embodiments, a waveguide-mode mediated coherent Smith-Purcell radiation is generated above the dielectric-grating waveguide.

According to some embodiments, the dielectric-grating waveguide further comprises a channel formed transversely to a surface of the dielectric-grating waveguide, wherein the electron beam propagates inside the channel to generate coherent or laser-like radiation inside the dielectric-grating waveguide.

According to some embodiments, the laser device further comprises a cover disposed over the dielectric-grating waveguide to include the electron beam and confine the radiation between the dielectric-grating waveguide and the cover.

According to some embodiments, the cover is a metallic plate or a metal-coated dielectric plate with a smooth surface or with a face-down grating structure.

According to some embodiments, the cover is a dielectric waveguide or a dielectric grating waveguide.

According to some embodiments, the free space is a vacuum.

According to some embodiments, the free space is an air space.

Additional objects and advantages of the invention will be set forth in the following descriptions with reference to the accompanying drawings.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed. For example, although a dielectric-grating waveguide driven by an electron beam is used to illustrate the present invention, similar concepts and benefits in the illustration are in general applicable to a dielectric-grating waveguide made of linear optical material, nonlinear optical material, and combination of both the linear and nonlinear optical materials.

Figure 2:
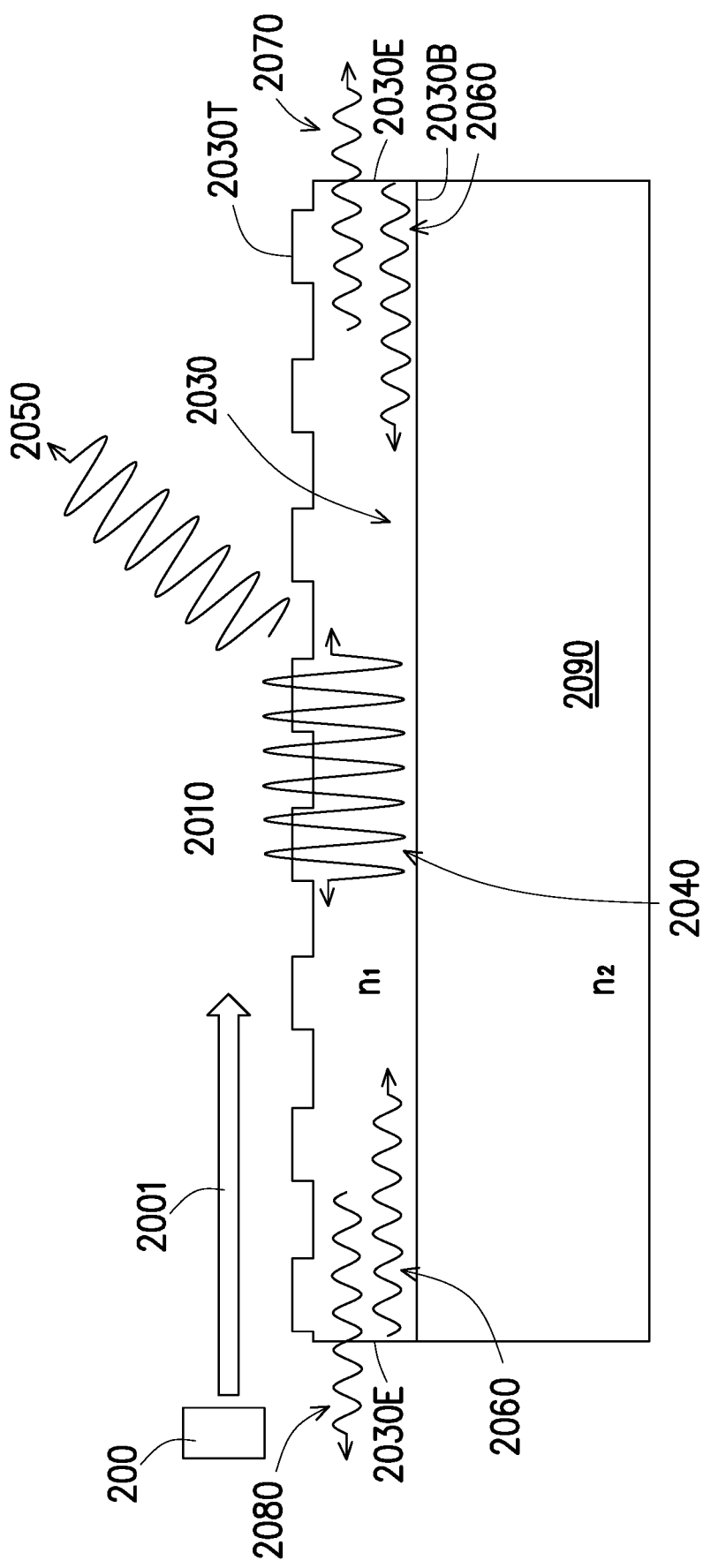
FIG. 2 is a schematic diagram of a dielectric-grating-waveguide free-electron laser according to some embodiments.

Refer to FIG. 2, which shows a dielectric-grating-waveguide free-electron laser according to a first embodiment of the present invention. As shown in FIG. 2, an electron beam 2001 is generated by an electron source 200. The electron beam 2001 propagates in free space 2010 atop a top surface 2030T of the dielectric-grating waveguide 2030 to generate guided radiation 2040 in the dielectric-grating waveguide 2030 and unguided Smith-Purcell radiation 2050 in the free space 2010. In some embodiments, the free space 2010 is vacuum. In some embodiments, the free space 2010 is an air space. The dielectric-grating waveguide 2030 has a corrugated slab structure at the top surface 2030T. The energy of the electron beam 2001 is coupled to the surface field of transverse-magnetic (TM) modes in the dielectric-grating waveguide 2030. To have continuous energy transfer from the electrons of the electron beam 2001 to the mode field of the dielectric-grating waveguide 2030, the phase velocity of the TM mode of the dielectric-grating waveguide 2030 is matched to the propagation velocity of the electron beam 2001.

The electron beam 2001 excites and amplifies the guided wave 2040 in the dielectric-grating waveguide 2030 into coherent or laser-like radiation with distributed feedback resonances from the grating grooves or the Fabry-Perot resonance from the reflections 2060 at the end facets 2030E of the dielectric waveguide 2030. The distributed feedback resonances are of two types. The first type is the so-called Bragg resonance, where the longitudinal resonant wavelength of the guided mode of the dielectric-grating waveguide 2030 is equal to twice the value of the grating period $\Lambda_g$ of the dielectric-grating waveguide 2030, so that the constructive interference of the reflecting waves from adjacent grating grooves sets up a standing wave in the dielectric-grating waveguide 2030, which establishes a laser oscillation inside the dielectric-grating waveguide 2030. The second type is the so-called backward-wave resonance, where the group velocity of the oscillation mode of the dielectric-grating waveguide 2030 is opposite to the propagation direction of the electron beam 2001, which establishes a laser oscillation inside the dielectric-grating waveguide 2030. In some embodiments, the Fresnel reflections 2060 from uncoated end facets 2030E of the dielectric-grating waveguide 2030 is enough to establish Fabry-Perot resonances to build up a laser oscillation inside the dielectric-grating waveguide 2030. In some embodiments, the end facets 2030E of the dielectric-grating waveguide 2030 are coated with high-reflecting optical layers to enhance the Fabry-Perot resonances. The resonant-mode wavelength depends on the energy of the electron beam 2001, and the mode characteristics and dispersion of the dielectric-grating waveguide 2030.

In general, a forward wave 2070 and a backward wave 2080 are generated as the outputs of the dielectric-grating waveguide 2030. In some embodiments, the backward wave 2080 is reflected toward the forward direction by applying high reflection coating at an end facet 2030E of the dielectric-grating waveguide 2030.

Figure 1:
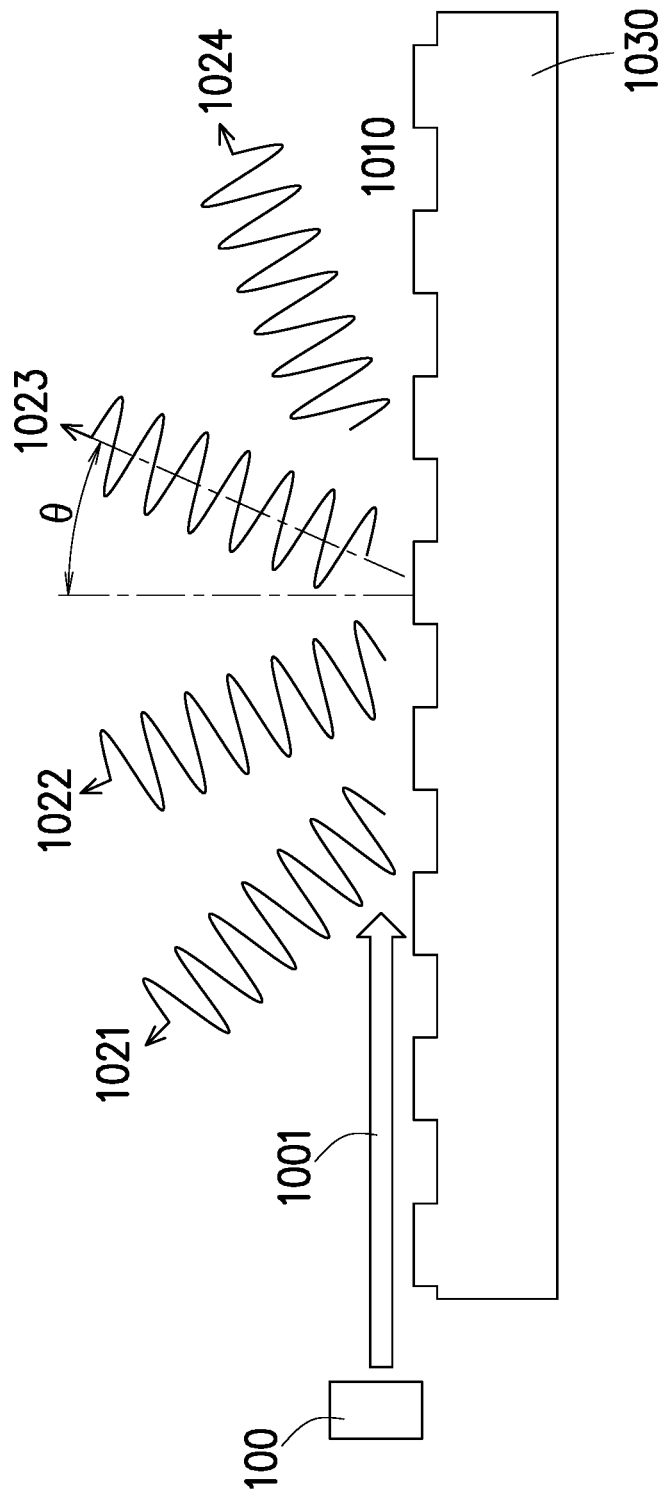
FIG. 1 is a schematic diagram of a Smith-Purcell radiator.

At the same time, a waveguide-mode mediated coherent Smith-Purcell radiation 2050 is generated as an additional laser output in the free space 2010 and above the dielectric-grating waveguide 2030, similar to the Smith-Purcell radiations 1021-1024 generated from a metal-grating Smith-Purcell radiator, as shown in FIG. 1, except that the Smith-Purcell radiation 2050 is a coherent or laser-like radiation enabled by the resonances in the dielectric-grating waveguide 2030.

In some embodiments, in order to guide the electromagnetic radiation 2040 along the dielectric-grating waveguide 2030, the dielectric-grating waveguide 2030 is fabricated on a substrate 2090. In some embodiments, the bottom surface 2030B is directly connects with the substrate 2090. In some embodiments, the substrate 2090 is a metal substrate with a low loss or a dielectric substrate wherein a refractive index of the dielectric substrate is lower than an average refractive index of the dielectric-grating waveguide 2030. In some embodiments, if the waveguide itself is thick and strong enough, the substrate 2090 may be omitted, wherein there is only a free space under the dielectric-grating waveguide 2030.

Figure 3:
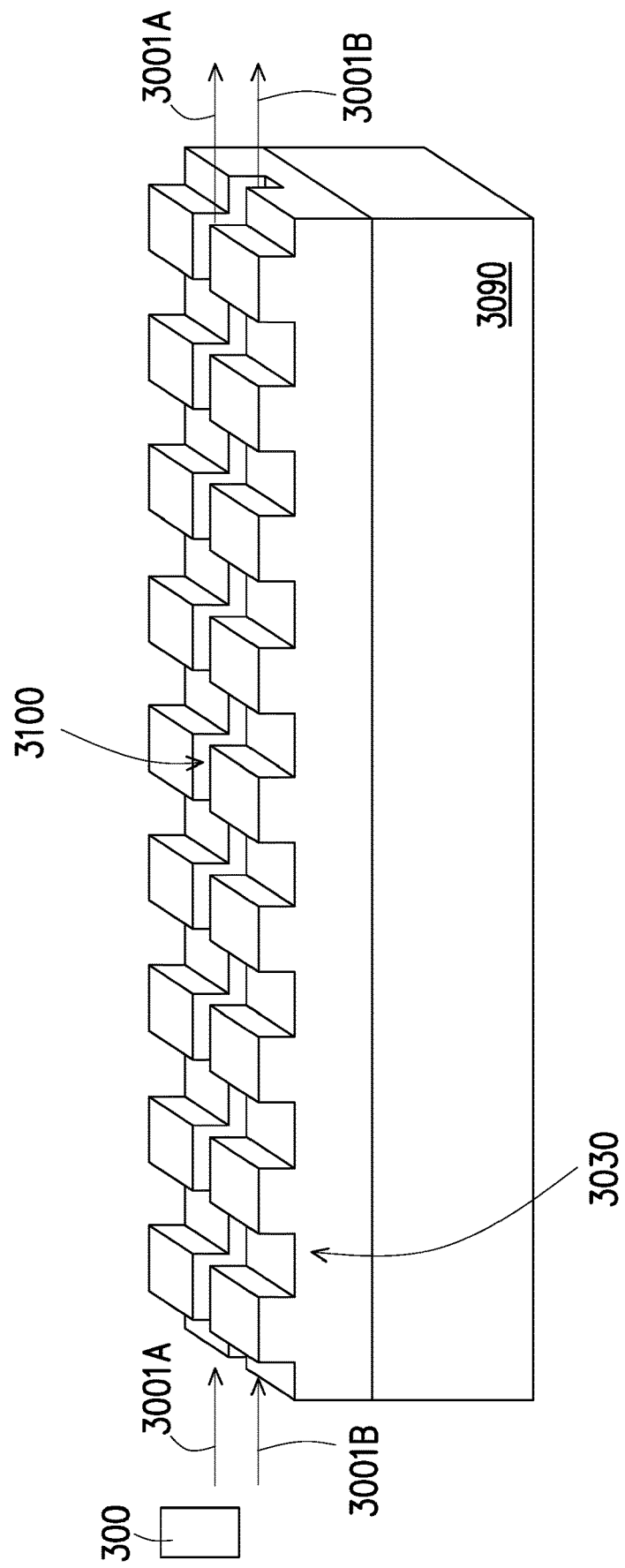
FIG. 3 is a schematic diagram of a channel-embedded dielectric-grating-waveguide free-electron laser according to some embodiments.

Refer to FIG. 3, which is a schematic diagram of a channel-embedded dielectric-grating-waveguide free-electron laser device with a buried electron channel 3100 cut or etched into the dielectric-grating waveguide 3030 according to a second embodiment of the present invention. The channel 3100 is formed transversely to a surface of the dielectric-grating waveguide 3030. In some embodiments, the electron source 300 generates and injects the electron beam 3001A and/or 3001B, which propagate inside the channel 3100, to generate coherent or laser-like radiation inside the dielectric-grating waveguide 3030. In some embodiments, the electron beam 3001A propagates inside the channel 3100 which is between the protruded portions of the gratings. In some embodiments, the electron beam 3001B propagates inside the channel 3100 at the bulk portion of the dielectric-grating waveguide 3030. Since the radiation is strongly guided in the dielectric-grating waveguide 3030, the energy coupling between the electron beam 3001 and the guided mode field of the dielectric-grating waveguide 3030 is greatly enhanced in the electron channel 3100. This strong energy coupling lowers the lasing threshold of the free-electron laser.

In some embodiments, the free-electron laser device further includes a substrate 3090 below the dielectric-grating waveguide 3030. The properties of the substrate 3090 is similar to the substrate 2090 of FIG. 2, which is not repeated hereof.

Figure 4:
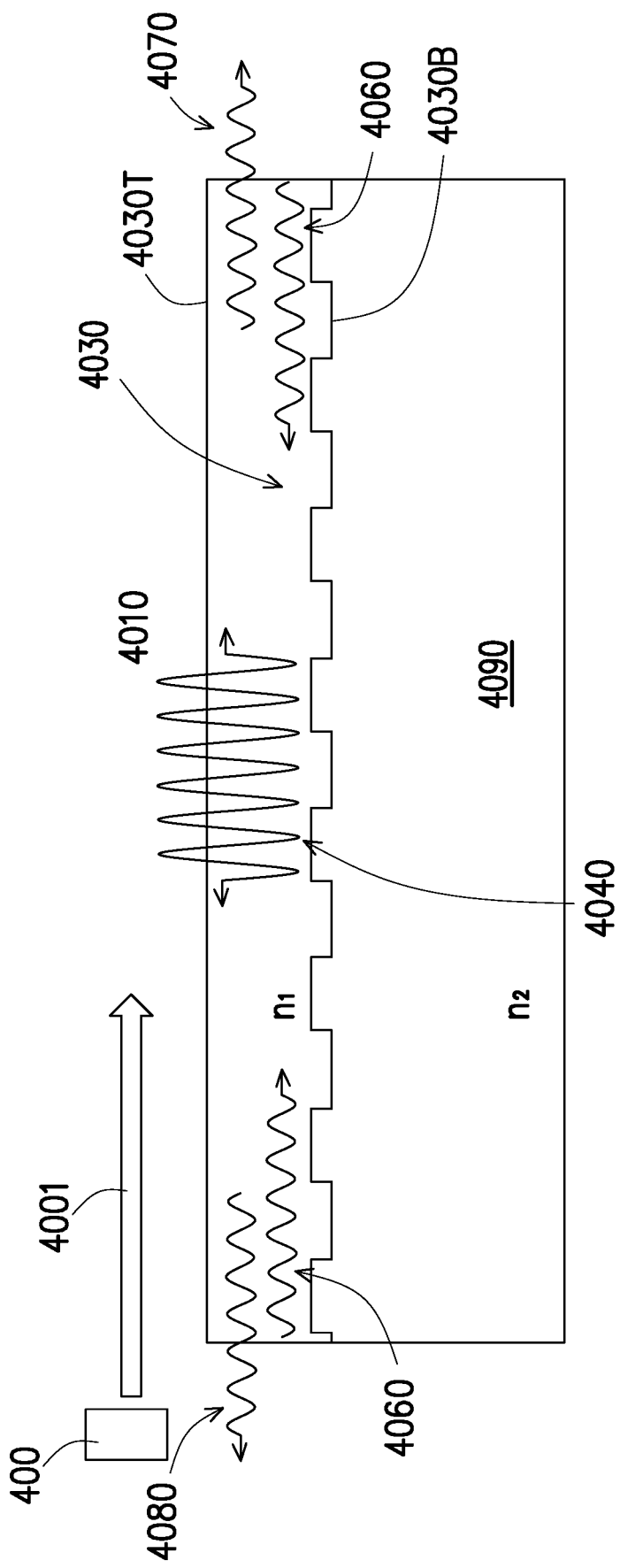
FIG. 4 is a schematic diagram of a flat-top dielectric-grating-waveguide free-electron laser according to some embodiments.

Refer to FIG. 4, which shows a flat-top dielectric-grating-waveguide free-electron laser according to a third embodiment of the present invention. In this embodiment, an electron beam 4001 is generated by an electron source 400. The electron beam 4001 propagates in a free space 4010 atop the dielectric-grating waveguide 4030 to generate guided radiation 4040. The properties of the free space 4010 is similar to the free space 2010 of FIG. 2, which is not repeated hereof. The difference between FIG. 2 and FIG. 4 is that, the dielectric-grating waveguide 4030 has a flat-top and is a flipped corrugated dielectric-grating waveguide. The electron beam 4001 is facing a top surface 4030T of the dielectric-grating waveguide 4030, which is a flat surface. The grating groove of the dielectric-grating waveguide 4030 is formed on the bottom surface 4030B, which is opposite to the surface 4030T and facing away from the electron beam 4001. In this configuration, the grating groove on the bottom surface 4030B of the dielectric-grating waveguide 4030 does not intercept and trap electrons of the electron beams 4001 to charge up the dielectric of the dielectric-grating waveguide 4030. In addition, since the top surface 4030T of the dielectric-grating waveguide is flat, the electrons of the electron beam 4001 can be closer to the mode field of the dielectric-grating waveguide 4030 for stronger energy coupling to generate the coherent or laser-like radiation, such as forward wave 4070 and a backward wave 4080.

Furthermore, since the top surface 4030T of the dielectric-grating waveguide 4030 facing the electron beams 4001 is flat, unlike FIG. 2, there is no radiation similar to the Smith-Purcell radiation 2050 in FIG. 2 being generated.

In some embodiments, the free-electron laser device shown in FIG. 4 further includes a substrate 4090 below the dielectric-grating waveguide 4030. The properties of the substrate 4090 is similar to the substrate 2090 of FIG. 2, which is not repeated hereof.

Figure 5:
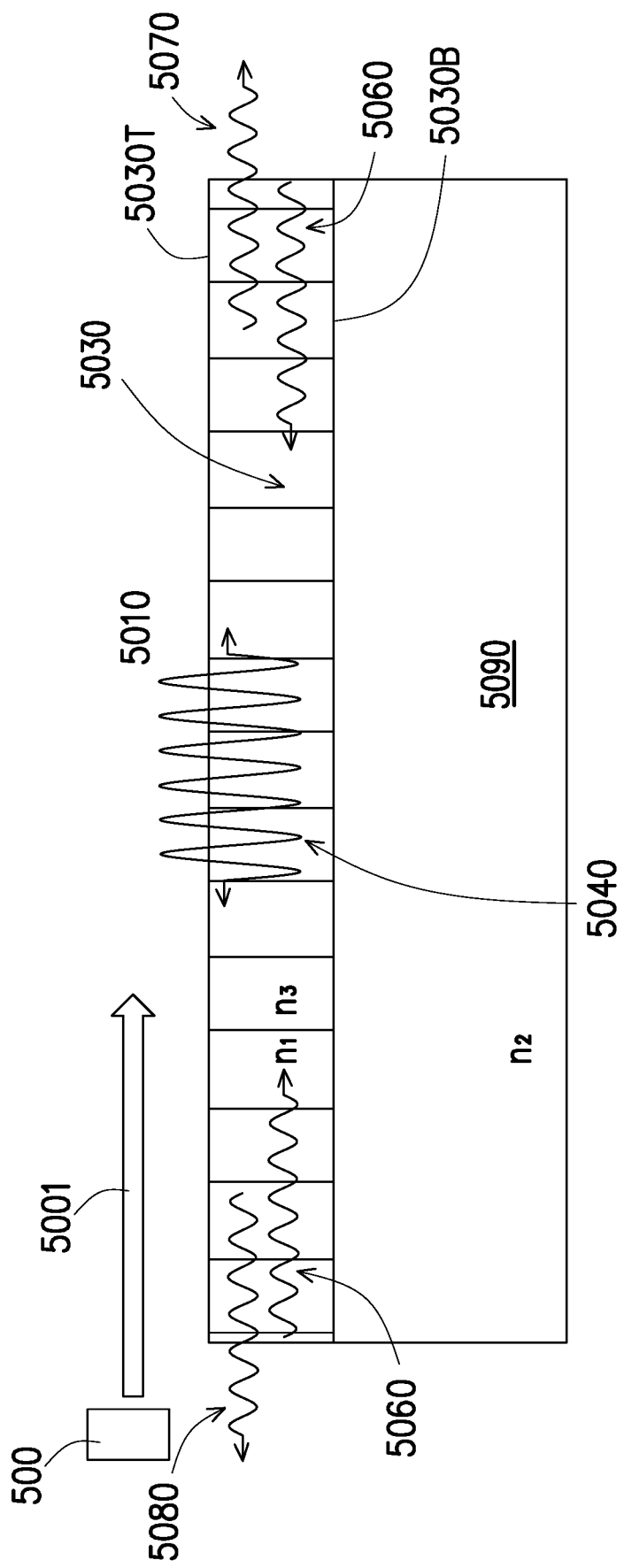
FIG. 5 is a schematic diagram of an index-varying dielectric-grating-waveguide free-electron laser according to some embodiments.

Refer to FIG. 5, which shows an index-varying dielectric-grating-waveguide free-electron laser according to a fourth embodiment of the present invention. In this embodiment, an electron beam 5001 is generated by an electron source 500. The electron beam 5001 propagates in a free space 5010 atop a smooth dielectric-grating waveguide 5030 to generate guided radiation 5040. The properties of the free space 4010 is similar to the free space 2010 of FIG. 2, which is not repeated hereof. A top surface 5030T of the dielectric-grating waveguide 5030 facing the electron beam 5001, and a bottom surface 5030B of the dielectric-grating waveguide 5030 facing away from the top surface 5030T are both flat. The dielectric-grating waveguide 5030 has a periodically varying refractive index in the waveguide slab along the propagation direction of the electron beam 5001. In some embodiment, the periodically varying refractive index in the waveguide slab has a hard boundary, which alternates between two different refractive indexes, such as $n_1$ and $n_3$ shown in FIG. 5. In some embodiments, the periodically varying refractive index in the waveguide slab varies continuously. The energy of the electron beam 5001 is coupled to the surface field of synchronous transverse-magnetic modes in the waveguide 5030.

In some embodiments, the free-electron laser device further includes a substrate 5090 below the dielectric-grating waveguide 5030. The properties of the substrate 5090 is similar to the substrate 2090 of FIG. 2, which is not repeated hereof.

Figure 6A:
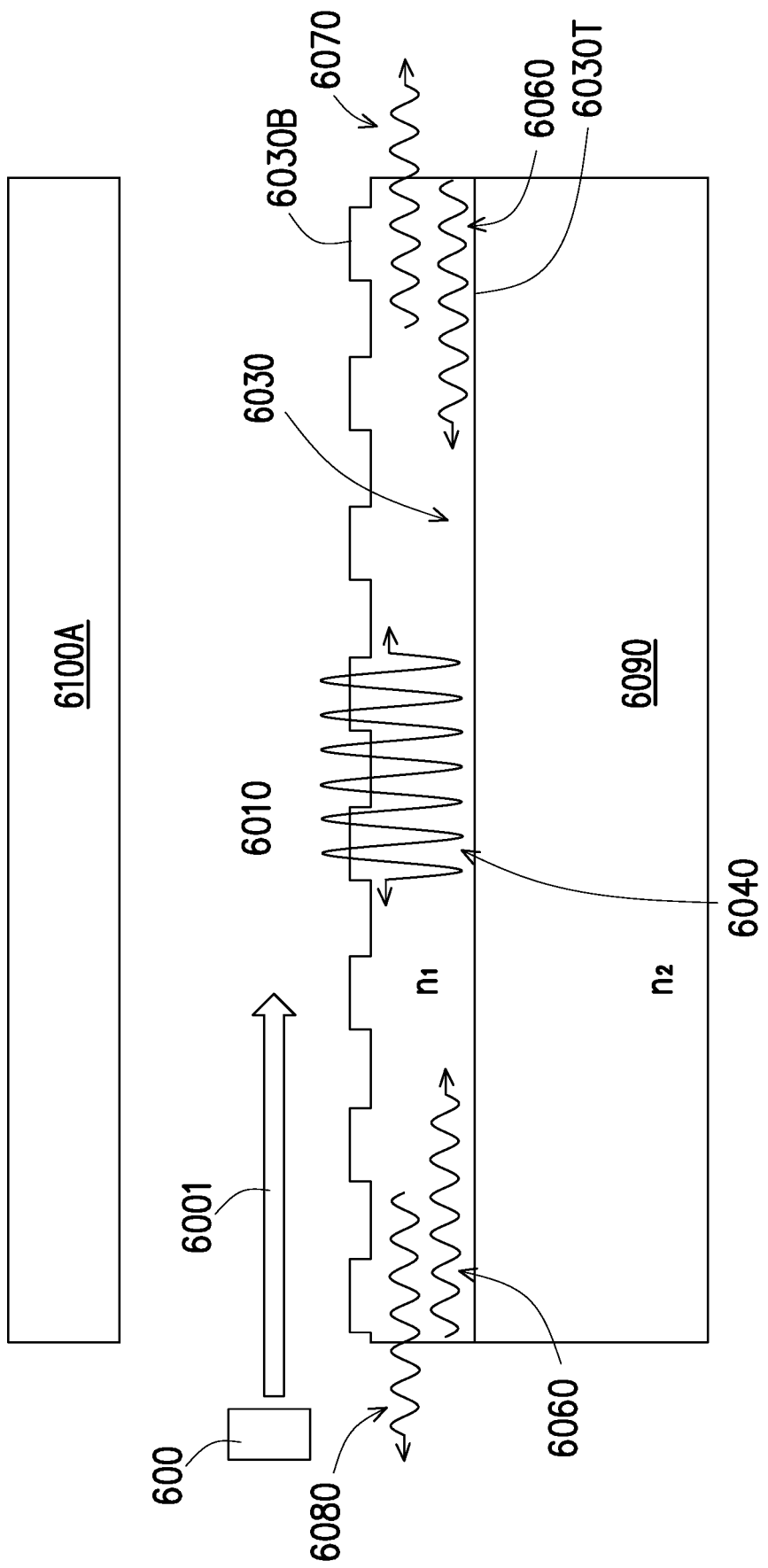
FIG. 6A and FIG. 6B are schematic diagrams of top-covered dielectric-grating-waveguide free-electron laser according to some embodiments.
Figure 6B:
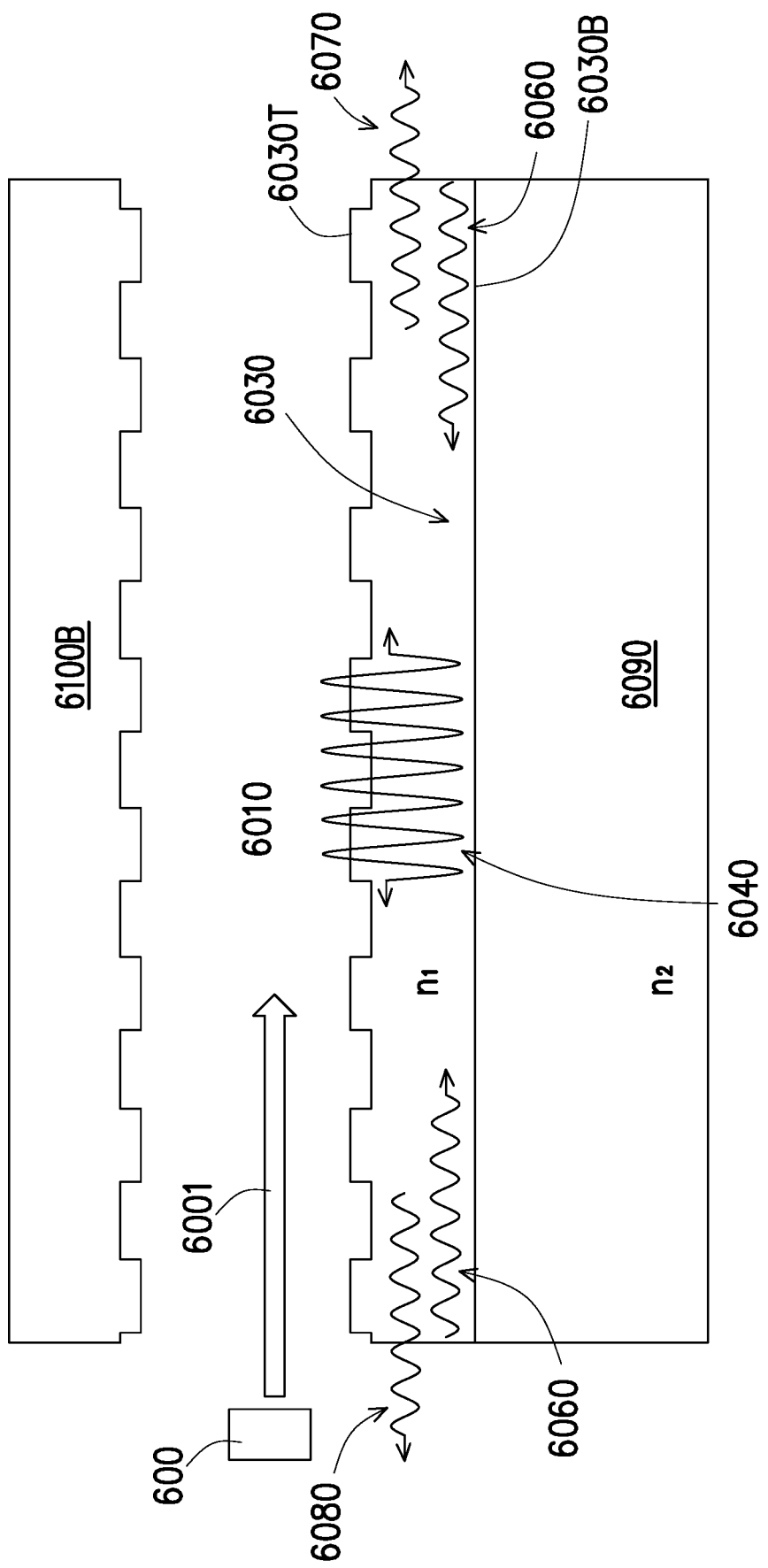

Refer to FIG. 6A and FIG. 6B, which are top-covered dielectric-grating-waveguide free-electron lasers according to a fifth embodiment of the present invention. In this embodiment, an electron beam 6001 is generated by an electron source 600. The electron beam 6001 propagates in a free space 6010 atop a dielectric-grating waveguide 6030 to generate guided radiation 6040. The properties of the free space 6010 is similar to the free space 2010 of FIG. 2, which is not repeated hereof. A cover, or a radiation confinement plate, 6100A, as shown in FIG. 6A, is disposed over the dielectric-grating waveguide 6030 to confine the guided radiation 6040 and increase the energy coupling from the electrons in the electron beam 6001 generated by an electron source 600. In some embodiments, the cover 6100A is a metallic plate or a metal-coated dielectric waveguide. In some embodiments, a surface of the cover 6100A facing the dielectric-grating waveguide 6030 is a smooth surface or a face-down grating structure. In some embodiments, the cover is a dielectric grating waveguide or a metallic grating, as shown in FIG. 6B. Again, the energy in the electron beam 6001 is coupled to surface field of the radiation 6400 inside the dielectric-grating waveguide 6030 and/or that under the cover 6100A/6100B.

In some embodiments, the free-electron laser device further includes a substrate 6090 below the dielectric-grating waveguide 6030. The properties of the substrate 6090 is similar to the substrate 2090 of FIG. 2, which is not repeated hereof. The material of the substrate 6090 can be a dielectric with a refractive index lower than that of the dielectric-grating waveguide 6030 or simply a free-space region. The distributed feedback resonances from the periodic structure of the grating or the Fabry-Perot resonance from the end reflections of the dielectric 6060 assists the buildup of the coherent or laser-like radiation from the present invention.

Figure 7A:
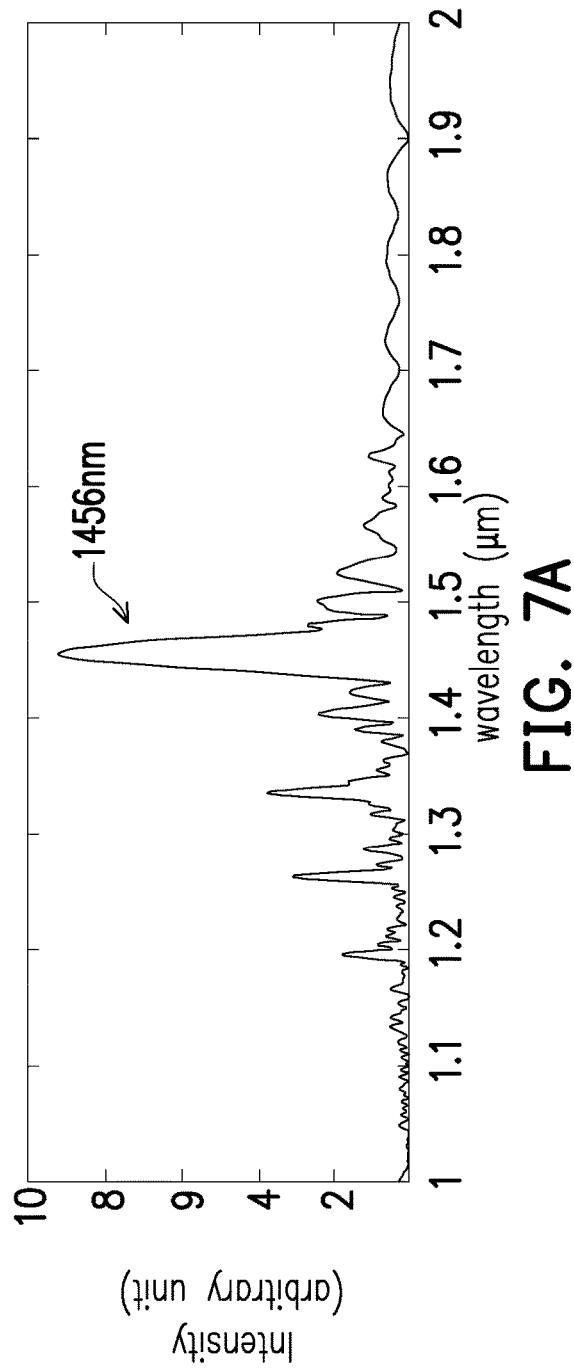
FIG. 7A and FIG. 7B shows the laser emission spectra of a dielectric-grating-waveguide FEL from a numerical experiment.
Figure 7B:
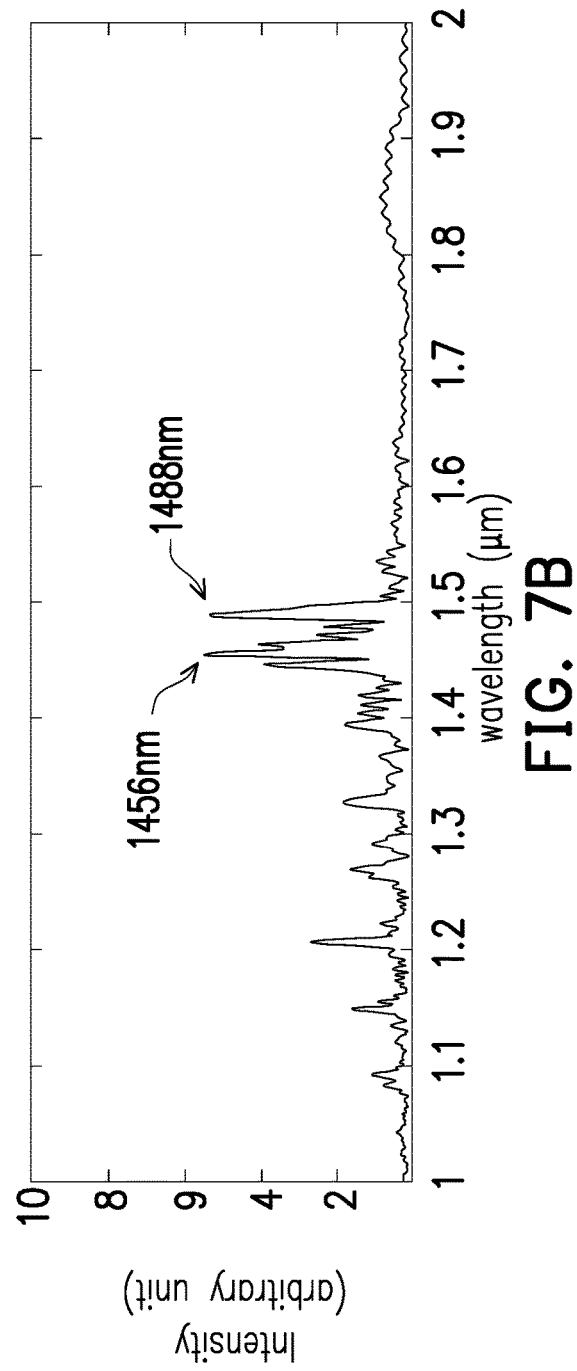

Refer to FIG. 7A and FIG. 7B, wherein FIG. 7A and FIG. 7B show the forward and backward emission spectra of a numerically simulated dielectric-grating-waveguide FEL with a silicon grating waveguide (refractive index=3.4) on a silica substrate (refractive index=1.5). The silicon grating has a period of 310 nm and a groove depth of 160 nm on a silicon film of 240 nm. The total length of the FEL is 31 μm, consisting of 100 grating periods. A 50 keV electron propagates 100 nm above the grating to generate the laser-like radiation in the spectra. The forward radiation has a narrow peak at 1456 nm, corresponding to a low-threshold Bragg mode of the waveguide. The other small peaks in the forward emission spectrum are high-order resonant modes. In the backward emission spectrum, the signal at 1456 nm still shows up due to the Bragg reflection of the grating and the Fresnel reflection from the downstream end facet; the spectral peak at 1488 nm is a result of laser oscillation from the backward-wave resonance; the other small peaks are mixtures of high-order Bragg and backward resonances. With more injecting electrons, the radiation feedback provided by the surface mode fields will bunch the electrons to generate intense stimulated laser radiation. The physics of the laser resonances in this numerical example is universal for a structure consisting of a dielectric-grating waveguide and is applicable to its variants illustrated in FIG. 2 to FIG. 6.

An electric field can induce polarization response in a dielectric. The response can be linear or nonlinear. In some dielectrics, the nonlinear response can be strong and the nonlinear susceptibilities of the dielectrics are large. Such dielectrics are called the nonlinear optical materials, when excited by an optical field. 5. Central-symmetric materials, including silicon, silica, and silicon nitride, exhibits linear and odd-order nonlinearities. Non-central symmetric materials, including lithium niobate, lithium tantalate, KTP, KTA, RTA, LBO, ZnTe, GaAs, SiC, GaN, DAST, and DSTMS, exhibit linear and even-order nonlinearities. When excited by a laser field, a $2^{nd}$-order nonlinear optical material is useful for nonlinear laser-wavelength conversions, such as second harmonic generation, parametric amplification and oscillation, difference frequency generation, and sum frequency generation. An externally applied electric field can also vary the refractive index of a nonlinear material and thereby alter the radiation phase in the material. This so-called electro-optic effect is useful for on-chip optical signal processing or actively controlling the radiation-generation process of the present invention. The dielectric-grating waveguides, 2030, 3030, 4030, 5030, 6030, in FIGS. 2-6, respectively, can therefore be made of linear optical materials, or nonlinear optical materials, or combination of linear and nonlinear optical materials to enable versatile functionalities such as laser generation, laser-wavelength conversion, and laser signal processing. For example, the silicon grating used for the simulation study in FIG. 7 can be replaced by a lithium niobate grating, so that the generated coherent or laser-like radiation at 1456 or 1488 nm is subsequently converted to its second harmonic at 728 or 744 nm in the same grating or in a monolithically integrated lithium-niobate crystal section.

Although the present invention has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A dielectric-grating-waveguide free-electron light-emitting device, comprising:
an electron source, generating an electron beam; and
a dielectric-grating waveguide, wherein the electron beam excites electromagnetic modes of the dielectric-grating waveguide to generate coherent or laser-like radiation along a direction of the electron beam,
wherein the electron beam induces distributed feedback resonances in the dielectric-grating waveguide, including Bragg resonances and backward-wave resonance, to establish a laser oscillation inside the dielectric-grating waveguide.

2. The light-emitting device according to claim 1, wherein the electron beam propagates in a free space atop the dielectric-grating waveguide.

3. The light-emitting device according to claim 1, wherein the dielectric-grating waveguide has a corrugated slab structure.

4. The light-emitting device according to claim 1, wherein the dielectric-grating waveguide has a smooth slab structure with a periodically varying refractive index.

5. The light-emitting device according to claim 1, wherein the dielectric-grating waveguide is made of a linear optical material.

6. The light-emitting device according to claim 1, wherein the dielectric-grating waveguide is made of a nonlinear optical material.

7. The light-emitting device according to claim 1, wherein the dielectric-grating waveguide is made of a combination of linear and nonlinear optical materials.

8. The light-emitting device according to claim 1, wherein the light-emitting device further comprises a substrate under the dielectric-grating waveguide to support the dielectric-grating waveguide.

9. The light-emitting device according to claim 8, a material of the substrate is a metal or a dielectric with a refractive index lower than an average refractive index of the dielectric-grating waveguide.

10. The light-emitting device according to claim 1, wherein the dielectric-grating waveguide supports a transverse-magnetic (TM) mode with a phase velocity of the TM mode matched to a velocity of the electron beam.

11. The light-emitting device according to claim 1, wherein a waveguide-mode mediated coherent Smith-Purcell radiation is generated above the dielectric-grating waveguide.

12. The light-emitting device according to claim 1, wherein the dielectric-grating waveguide further comprises a channel formed transversely to a surface of the dielectric-grating waveguide, wherein the electron beam propagates inside the channel to generate coherent or laser-like radiation inside the dielectric-grating waveguide.

13. The light-emitting device according to claim 1, wherein the light-emitting device further comprises a cover disposed over the dielectric-grating waveguide to include the electron beam and confine the radiation between the dielectric-grating waveguide and the cover.

14. The light-emitting device according to claim 13, wherein the cover is a metallic plate or a metal-coated dielectric plate with a smooth surface or with a face-down grating structure.

15. The light-emitting device according to claim 13, wherein the cover is a dielectric waveguide or a dielectric grating waveguide.

16. The light-emitting device according to claim 2, wherein the free space is a vacuum.

17. The light-emitting device according to claim 2, wherein the free space is an air space.

* * * * *